United States Patent
Sarnowski et al.

(10) Patent No.: US 11,497,204 B2
(45) Date of Patent: Nov. 15, 2022

(54) ROTATABLE MOUNT

(71) Applicant: GEM Products, Inc., Jacksonville, FL (US)

(72) Inventors: Jason Sarnowski, Jacksonville, FL (US); William Ashford Gravely, Washington, NC (US)

(73) Assignee: GEM Products, Inc., Jacksonville, FL (US)

( * ) Notice: Subject to any disclaimer, the term of this patent is extended or adjusted under 35 U.S.C. 154(b) by 499 days.

(21) Appl. No.: 16/582,853

(22) Filed: Sep. 25, 2019

(65) Prior Publication Data
US 2021/0084879 A1    Mar. 25, 2021

(51) Int. Cl.
*A01K 97/00* (2006.01)
*A01K 97/10* (2006.01)
*F16M 13/02* (2006.01)

(52) U.S. Cl.
CPC ............. *A01K 97/10* (2013.01); *F16M 13/02* (2013.01); *A01K 2227/40* (2013.01)

(58) Field of Classification Search
CPC .... A01K 97/10; A01K 2227/40; F16M 13/00; F16M 13/02; F16M 2200/021; F16M 2200/022
USPC .................................................. 43/21.2, 27.4
See application file for complete search history.

(56) References Cited

U.S. PATENT DOCUMENTS

| | | | | |
|---|---|---|---|---|
| 4,948,083 A * | 8/1990 | McNaney, Jr. | ........ | A01K 91/08 248/289.11 |
| 4,988,065 A * | 1/1991 | Leban | .................. | B60R 13/005 428/31 |
| 5,054,737 A * | 10/1991 | DeLancey | .............. | A01K 97/10 248/515 |
| 6,634,134 B1 * | 10/2003 | Nyquist | ................. | A01K 97/10 43/16 |
| 6,668,745 B2 | 12/2003 | Slatter | | |
| 6,898,893 B1 * | 5/2005 | Mukdaprakorn | ...... | A01K 97/10 248/538 |
| 7,007,906 B2 * | 3/2006 | Slatter | .................... | A01K 91/08 43/21.2 |
| 7,114,283 B2 * | 10/2006 | Slatter | .................... | A01K 91/08 43/27.4 |
| 8,186,893 B1 * | 5/2012 | Patterson | ............... | F16M 11/10 396/428 |
| 8,231,149 B1 * | 7/2012 | Shelby | .................. | E05B 83/243 292/202 |
| 9,532,559 B1 * | 1/2017 | Hemmerlin | ............ | F16M 13/02 |
| 9,625,087 B2 * | 4/2017 | Sarnowski | ............. | A01K 91/08 |
| D839,989 S | 2/2019 | Denton | | |
| 2003/0005616 A1 * | 1/2003 | Slatter | .................... | A01K 91/08 43/27.4 |
| 2008/0061197 A1 * | 3/2008 | Carnevali | ............ | F16M 13/022 248/181.1 |
| 2009/0084019 A1 * | 4/2009 | Carnevali | .............. | A01K 97/10 248/521 |
| 2012/0056057 A1 * | 3/2012 | Huang | .................... | F16M 11/18 248/288.11 |

(Continued)

*Primary Examiner* — Richard T Price, Jr.
(74) *Attorney, Agent, or Firm* — Seyfarth Shaw LLP

(57) ABSTRACT

A mount including a base and a handle. The base is capable of releasably coupling to a pole, for example outrigger poles, fishing rods, and shade poles. A handle of the mount can be loosened to allow the base to be rotated to position the pole in a desired extended direction. When the handle is tightened, the base is restricted from rotating.

18 Claims, 6 Drawing Sheets

(56) References Cited

U.S. PATENT DOCUMENTS

| | | | |
|---|---|---|---|
| 2015/0366180 A1* | 12/2015 | Chmura | A01K 97/10 248/125.7 |
| 2018/0164662 A1* | 6/2018 | Olmos-Calderon | F16M 11/041 |
| 2018/0299061 A1* | 10/2018 | Neundorf | F16M 11/041 |
| 2019/0004401 A1* | 1/2019 | Wilson | F16M 13/02 |
| 2019/0014767 A1* | 1/2019 | Carnevali | A01K 91/08 |
| 2019/0195252 A1* | 6/2019 | Pryor | F16B 2/12 |

\* cited by examiner

ROTATABLE MOUNT

TECHNICAL FIELD OF THE INVENTION

The present invention relates generally to mounts. More particularly, the present invention relates to mounts adapted to couple to poles, such as, for example, outrigger poles, fishing rods, and/or shade poles on boats.

BACKGROUND OF THE INVENTION

Mounts are often used to secure poles, such as outrigger poles, fishing rods, and shade poles to boats, such as, for example, above a T-top of center console boats. Current solutions either cannot allow for directional adjustment, cannot accommodate all of these types of poles, have complex mechanisms, and/or are expensive to produce.

Outriggers are popular in fishing applications. Outriggers are rigid poles that are a part of the boats rigging and are designed to extend the fishing pole bait lines out beyond the "white wash" of the water surrounding the boat. This is preferable because bait traveling through clear water is more likely to successfully attract a fish, compared to white water cause by the boat and propeller wash. Once a fish is caught by the hook, the line is automatically released from the outrigger and all forces are transferred directly to a fishing pole secured to the gunnel of the boat. Outriggers are typically secured in mounts that are rotatable in multiple rotational directions, such as, for example, mounts disclosed in U.S. Pat. Nos. 9,625,087, 6,668,745, and 7,114,283. For example, the mount can be rotated, so the outrigger can be aimed in a desired direction.

In order to secure fishing rods to boats, a fishing rod holder, such as U.S. Pat. No. D839,989, may be installed. While current solutions can sometimes include a means to allow directional adjustment, these solutions do not accommodate and are not robust enough to allow for safe use of shade poles and/or outrigger poles. Thus, users are forced to either use bases that only allow the use of some types of poles, thereby forfeiting the use of other types of poles, or install multiple bases to accommodate all types of poles, thereby causing additional complexity and cost.

SUMMARY OF THE INVENTION

The present invention broadly comprises a mount capable of coupling to a pole, for example outrigger poles, fishing rods, and shade poles. The mount can be rotated to position the pole in a desired extended direction using a simple and secure means compared to the prior art. Once a desired position is reached, the mount can be restricted from further movement by tightening a handle.

In an embodiment, the present invention broadly comprises a mount having a first plate, a handle, and a base. The base is adapted to be releasably coupled to the first plate by the handle when the handle is rotated in a first rotational direction and adapted to be rotated relative to the first plate when the handle is rotated in a second rotational direction.

In another embodiment, the present invention broadly includes a mount having a first plate disposed on a first side of a support structure and including apertures, a seal coupled to the first plate, a second plate disposed on a second side of the support structure, a first gasket disposed between the first plate and the first side of the support structure, a second gasket disposed between the second plate and the second side of the support structure, a handle adapted to rotate in first and second rotational directions and including a grip portion and a threaded shank portion, and a base. The base includes a tubular portion adapted to receive a pole, a bell-portion that includes an aperture adapted to threadably couple with the threaded shank portion, and protrusions adapted to respectively releasably couple with the apertures of the first plate. The protrusions respectively couple with the apertures when the handle is rotated in the first rotational direction, and the base is adapted to be rotated relative to the first plate when the handle is rotated in the second rotational direction.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
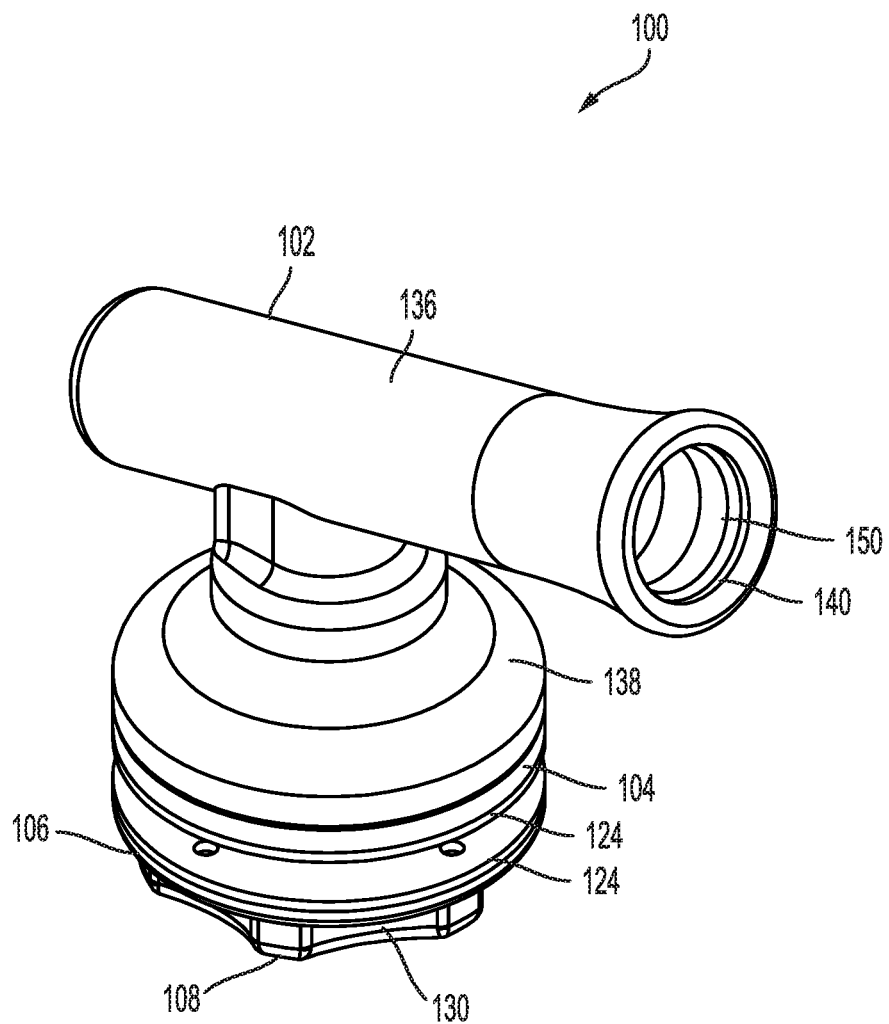
FIG. 1 is a side perspective view of a mount according to an embodiment of the present invention.
Figure 2:
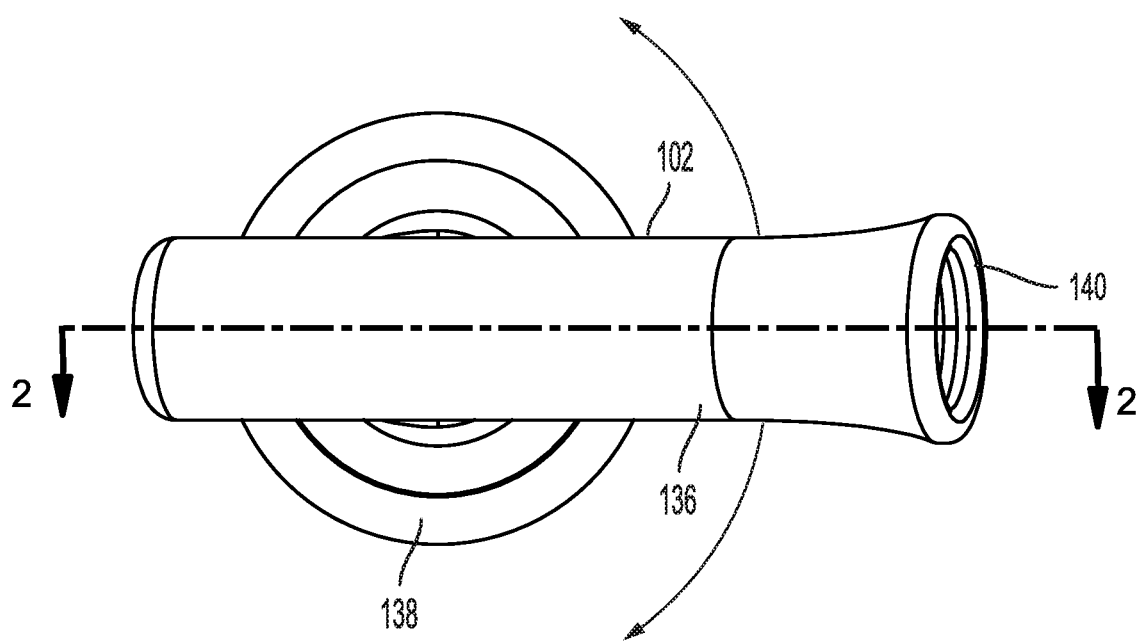
FIG. 2 is a top plan view of the mount of FIG. 1.
Figure 3:
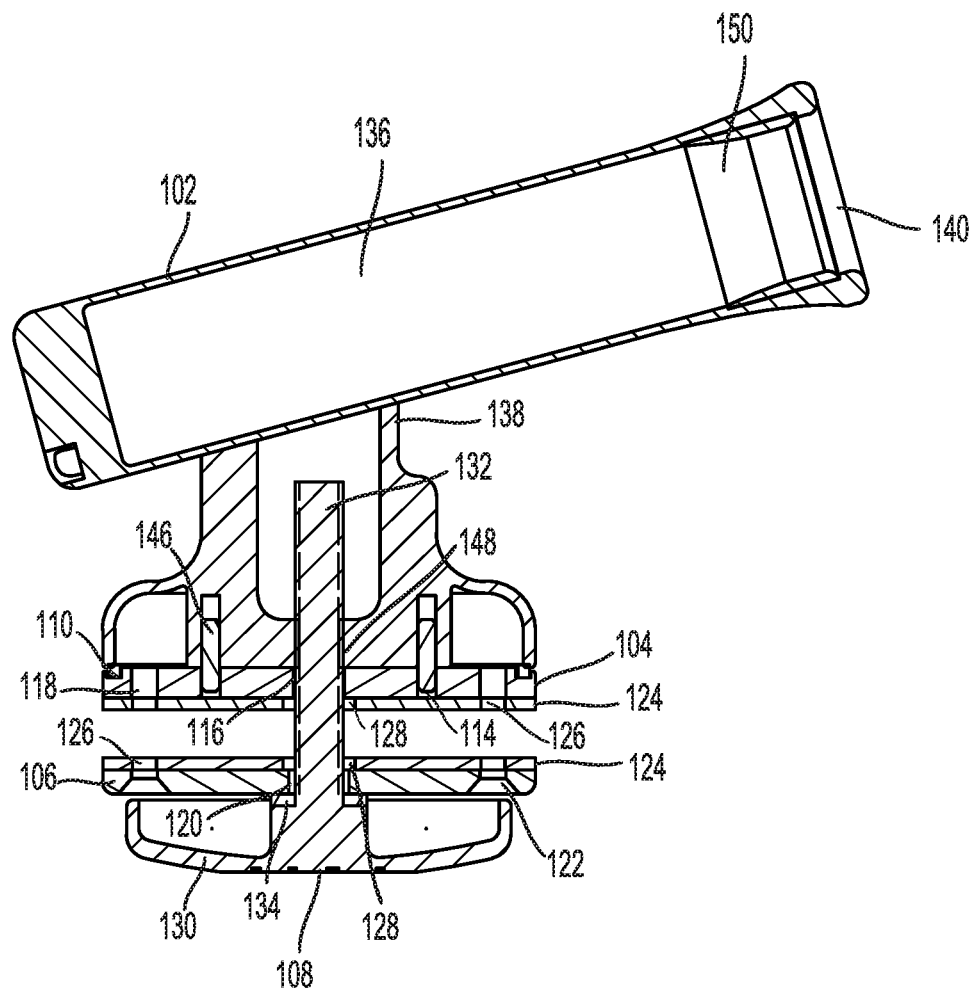
FIG. 3 is a side cross-sectional view of the mount of FIG. 1, as taken along line 2-2 in FIG. 2.
Figure 4:
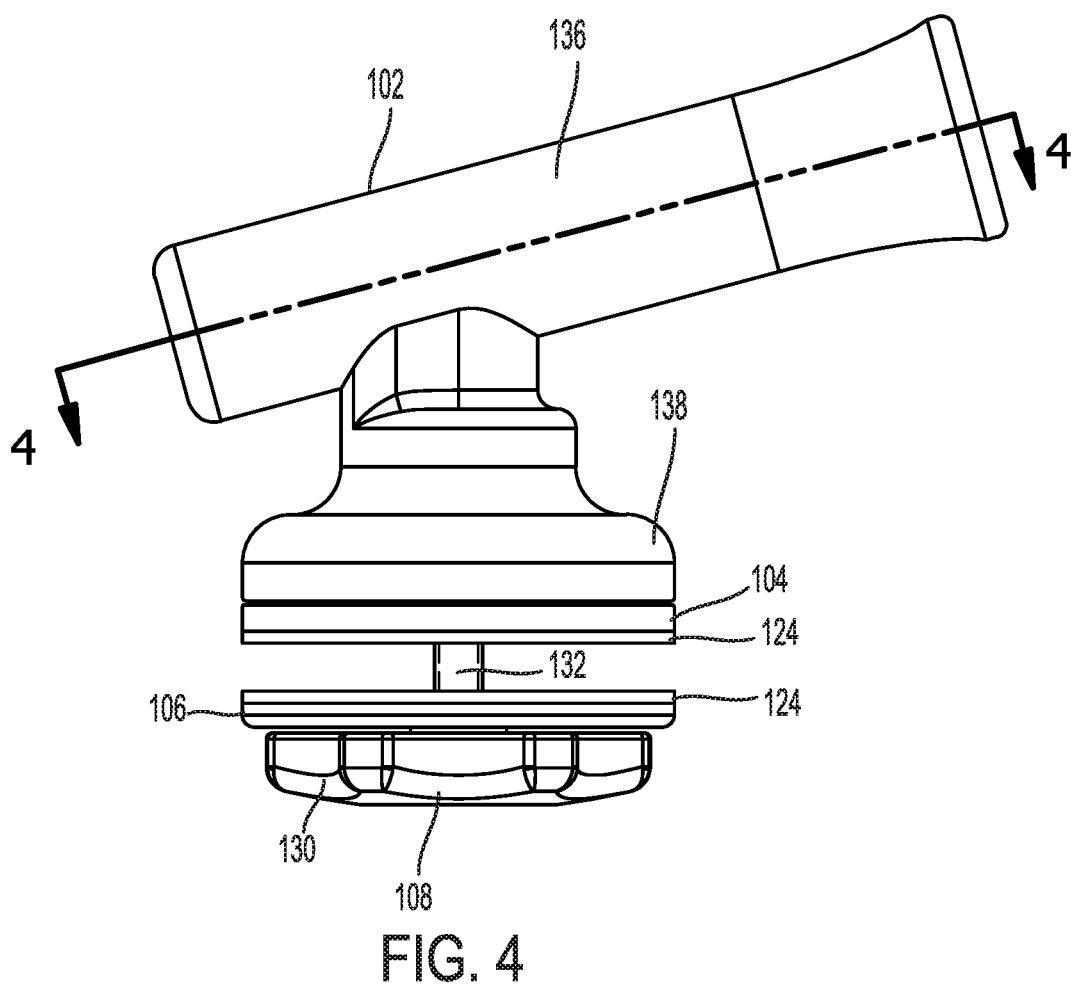
FIG. 4 is a side elevation view of the mount of FIG. 1.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a mount having a base adapted to releasably couple with a pole. The pole can be, for example and without limitation, an outrigger pole, a fishing rod, a shade pole, etc. The base is adapted to be coupled to a support structure, such as, for example, a T-top of a center console boat or boat hull, and can be rotated relative to the support structure so the pole extends in a desired direction. The base can be releasably locked and thus restricted from further rotation when a handle is rotated, causing it to lock.

Referring to FIGS. 1-7, in an embodiment, a mount 100 can include a base 102 that is adapted to releasably couple a pole (not shown) to a support structure, such as a boat. As discussed below, the base 102 is adapted to be coupled to the support structure (not shown) using first 104 and second 106 plates (also referred to as upper and lower plates) and a handle 108. The base 102 can be rotatable in first and second rotational directions (indicated by arcuate arrows in FIG. 2) relative to the support structure at fixed angle increments.

The support structure can be part of a boat, such as, for example, a T-top of a center console boat or boat hull.

The first plate 104 is disposed on a first side of the support structure and can be constructed from stainless steel, or other suitable material and is adapted to couple with the base 102. The first plate 104 can include a groove 110 adapted to receive a seal 112. The first plate 104 can include one or more apertures 114. As shown, in an embodiment, the number of apertures 114 allow for rotation of the base 102 at 22.5° increments, as discussed below. However, it will be appreciated that the angular increments can be increased or decreased by adjusting the number and placement of the apertures 114. The first plate 104 can also include a clearance aperture 116 for the handle 108.

The first plate 104 includes one or more mounting apertures 118 adapted to receive fasteners, such as screws or bolts. The mounting apertures 118 can be threaded to respectively threadably engage the fasteners. In another embodiment, the mounting apertures 118 are clearance holes for the fasteners.

The seal 112 can be made from EPDM rubber, or other suitable material. In an embodiment, the seal 112 is an O-ring. However, other suitable seals can be used. The seal 112 is adapted to frictionally mate with the groove 110 of the first plate 104 and can be further secured therein with adhesive, if desired. When the base 102 is coupled to the first plate 104, the seal 112 is compressed therebetween, thereby creating a water-resistant seal to restrict or minimize water intrusion.

The second plate 106 is disposed on a second side of the support structure and can be constructed from stainless steel, or any other suitable material. The second plate 106 can include a clearance aperture 120 for the handle 108, as discussed below. The second plate 106 includes one or more mounting apertures 122 adapted to respectively receive fasteners, such as screws or bolts. In one embodiment, the mounting apertures 122 are countersunk to receive a head of the fastener.

The mount 100 can further include one or more gaskets or seals 124 disposed between each of the first 104 and second 106 plates and the support structure. The gaskets 124 can be constructed from a closed cell EVA foam, or any other suitable material, for sealing between the first 104 and second 106 plates and the support structure. The gaskets 124 are adapted to restrict or minimize water intrusion. The gaskets 124 can include clearance apertures 126, 128 adapted to allow fasteners and/or the handle 108 to pass therethrough.

The first 104 and second 106 plates can be coupled to the support structure by respectively inserting fasteners through the mounting apertures 118 and 122 of the first 104 and second 106 plates. After the fasteners are tightened, the first 104 and second 106 plates compress the gaskets 124 against the support structure. If the mounting apertures 118 of the first plate 104 are not threaded, installation can be accomplished by coupling a washer and a locknut to the respective fasteners.

The handle 108 can include a grip portion 130 and a shank portion 132. The grip portion 130 can include an ergonomic grip to allow a user to grasp and turn the handle 108 in a first rotational direction to couple the base 102 to the first plate 104, thereby restricting further rotation of the base 102, or in a second rotational direction to allow for rotational adjustment of the base 102. In other words, by turning the handle 108 in the rotational first direction, the handle 108 is loosened, which allows for the base 102 to be lifted away from the first plate 104, rotated to a desired position, and then lowered to and recoupled with the first plate 104. By rotating the handle 108 in the second rotational direction, the handle 108 is tightened and holds the base 102 securely in position, also referred to as an operation mode of the mount 100. The shank portion 132 is adapted to extend through the first 104 and second 106 plates and the gaskets 124 and can be constructed from stainless steel, or other suitable material. The shank portion can be partially or fully threaded and is adapted to couple with the base 102, as is described in more detail below. In an embodiment, the handle 108 can be a threaded knob. In another embodiment, the handle 108 is coupled to the mount 100 such that the handle 108 remains coupled to the mount 100 when the handle 108 is fully loosened from and no longer coupled to the base 102.

A washer 134 can be disposed between the handle 108 and the second plate 106. The washer 130 can be made from fiberglass, or other suitable material, and functions as a contact surface between the handle 108 and the lower plate 106, thereby allowing for tightening of the handle 108 without marring the lower plate 106.

Figure 5:
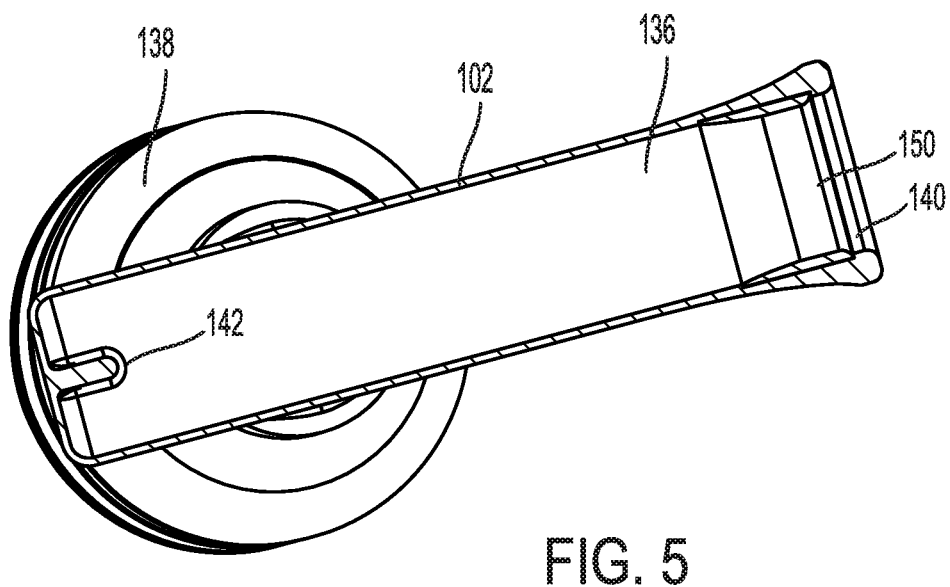
FIG. 5 is a top cross-sectional view of the mount of FIG. 1, as taken along line 4-4 in FIG. 4.
Figure 6:
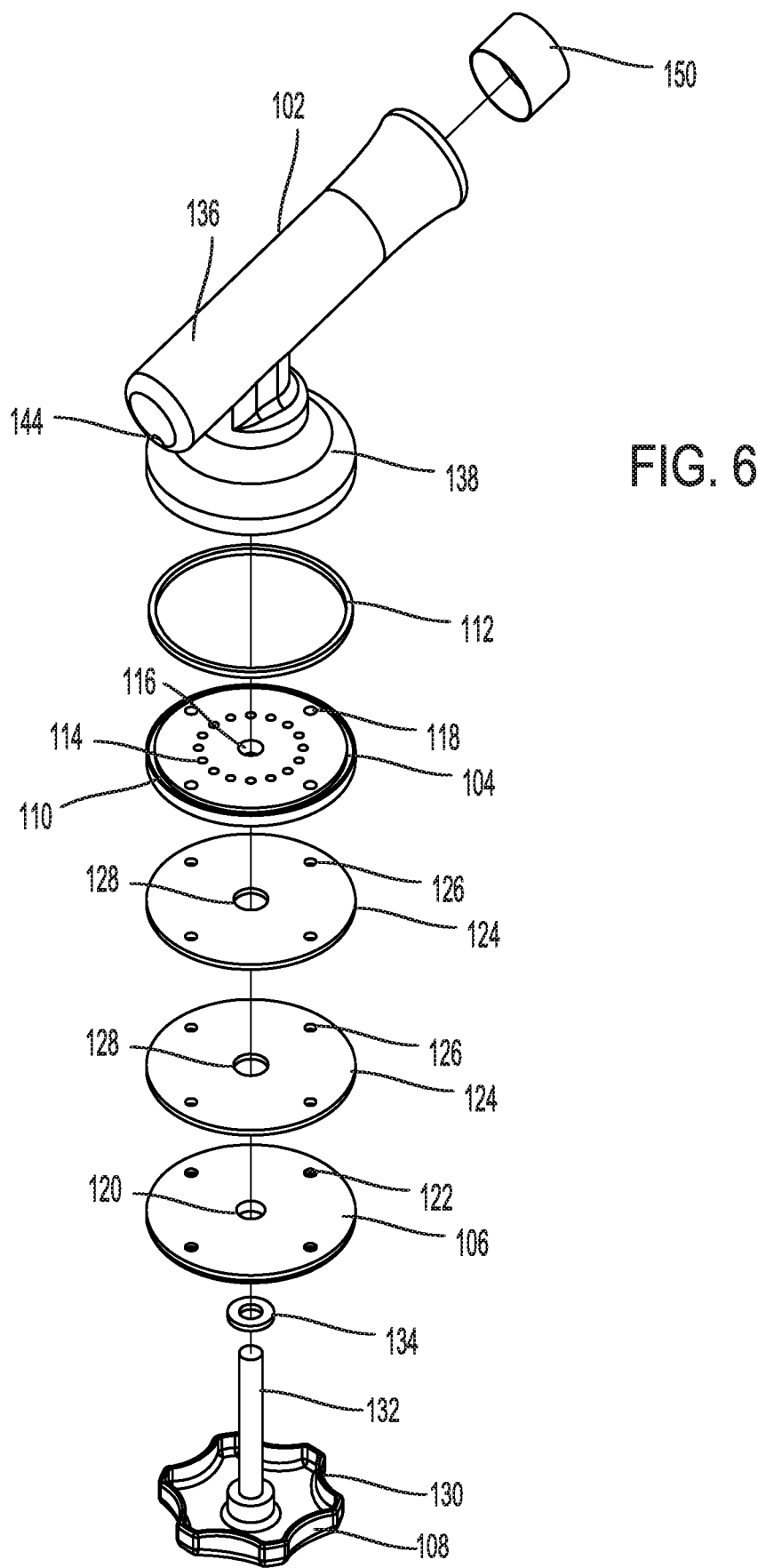
FIG. 6 is a side perspective exploded view of the mount of FIG. 1.
Figure 7:
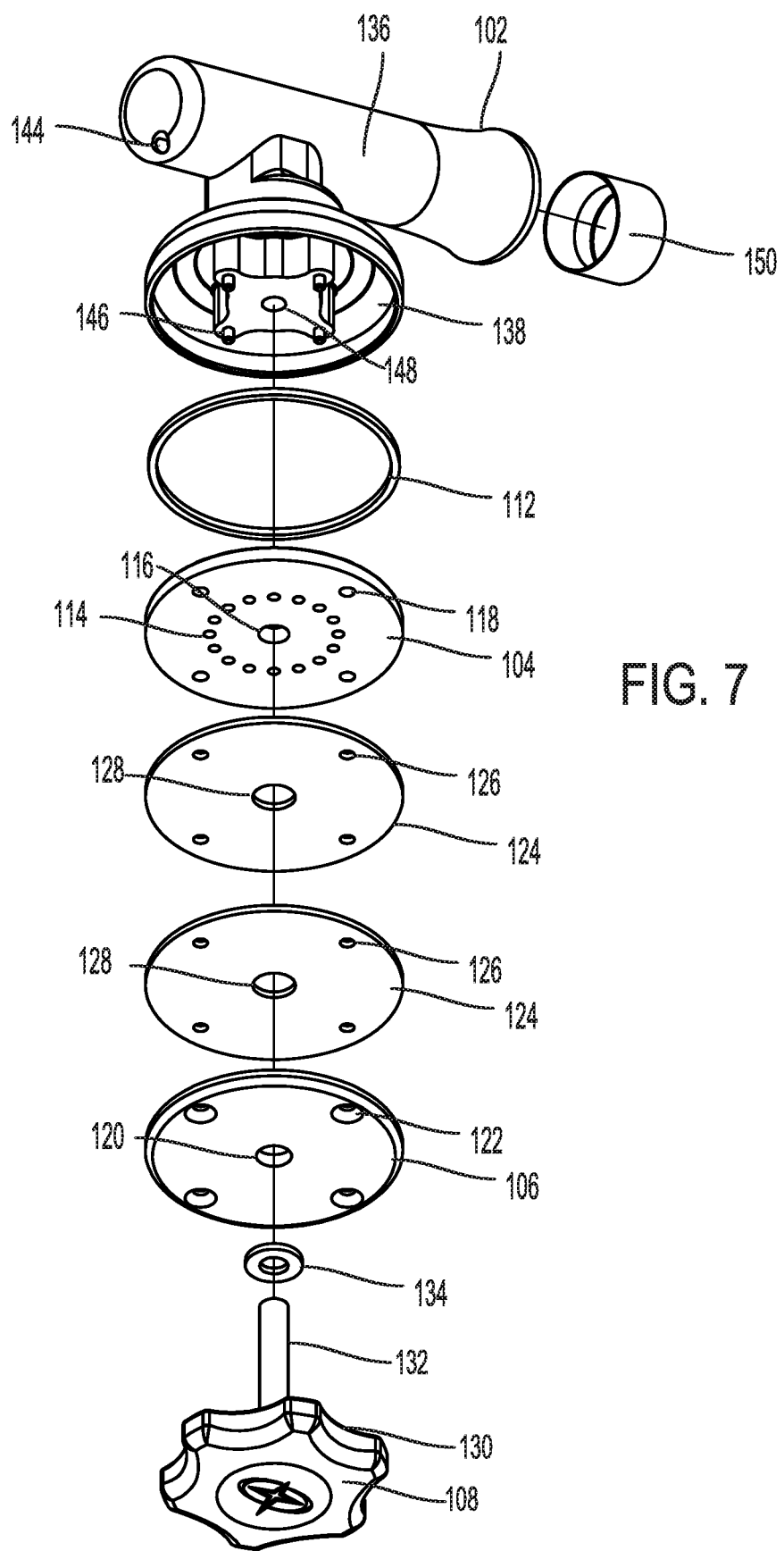
FIG. 7 is another side perspective exploded view of the mount of FIG. 1.

The base 102 can be constructed from stainless steel, or other suitable material, and includes a tubular portion 136 coupled to or integral with a bell-shaped portion 138. The tubular portion 136 is disposed at a specific angle relative to the bell-shaped portion 138 and could be disposed at any suitable angle. In another embodiment, the tubular portion 136 and the bell-shaped portion 138 are separate pieces coupled together using a pivoting connection, so the angle therebetween can be adjusted. The tubular portion 136 has an opening 140 adapted to receive a pole. In an embodiment, the tubular portion 136 is coupled to the pole with a pin that passes through respective apertures in the tubular portion 136 and the pole, thereby retaining the pole in the tubular portion 136. Referring to FIG. 5, the tubular portion 110 can include a rigid bar 142, such as, for example, a pin, disposed at an end opposite the opening 140 and adapted to couple with the pole to restrict rotation about a longitudinal axis of the tubular portion 136. The tubular portion 136 can include a drain aperture 144, which provides a path for water drainage from within the tubular portion 136.

The bell-shaped portion 138 can include one or more protrusions 146, such as, for example, pins pressed into or otherwise formed on the bell-shaped portion 138. The protrusions 146 are adapted to releasably couple with the one or more apertures 114 disposed in the first plate 104 to restrict rotational movement of the base 102 about a primary axis of the first plate 104. The bell-shaped portion 112 can also include an aperture 148 adapted to couple to the shank portion 132 of the handle 108. The aperture 148 can be threaded. The bell-shaped portion 138 increases stability of the mount 100 when the mount 100 is in an operational mode. When the handle 108 is fully tightened, the first plate 104 is in contact with a lower surface of the bell-shaped portion 138, thereby compressing the seal 112 to restrict water intrusion between the base 102 and the first plate 104. In an embodiment, the bell-shaped portion 138 can be hollow to reduce weight, manufacturing cost, and to accommodate hardware holding the first 104 and second 106 plates to the support structure.

In an embodiment, a liner 150 may be disposed in the opening 140 of the tubular portion 136. In an embodiment, the liner 150 may be pressed into the opening 140. The liner 150 can be constructed from a non-marring plastic to prevent damage to the pole inserted into the tubular portion 136 by offering a softer point of contact.

In another embodiment, a bias member, such as a spring, can be disposed between the first plate 104 and the base 102.

The bias member is adapted to provide a bias to disengage the first plate 104 and the base 102 when the handle 108 is loosened.

In another embodiment, a bearing surface is disposed between the shank portion 132 of the handle 108 and one or both of the clearance apertures 116, 120 of the first 104 and 106 second plates. When the base 102 is lifted, the bearing surface(s) assist in keeping the lower surface of the base 102 substantially parallel to the first plate 104, which aids in alignment of the protrusions 146 and the one or more apertures 114.

As discussed above, the mount 100 may hold outrigger poles, fishing rods, and shade poles for use in fishing or boating applications. However, the mount 100 can be utilized with any type of pole (referred to broadly as a "body"), and not necessarily only outrigger poles, fishing rods, and shade poles.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A mount adapted to couple to a support structure having opposing first and second sides, the mount comprising:
   a first plate;
   a handle including a grip portion adapted to be disposed on the second side of the support structure and is rotatable in first and second rotational directions; and
   a base adapted to be disposed on the first side of the support structure and further adapted to be releasably coupled to the first plate by the handle when the grip portion is rotated in the first rotational direction, and to be rotated relative to the first plate when the grip portion is rotated in the second rotational direction.

2. The mount of claim 1, further comprising a second plate.

3. The mount of claim 2, further comprising:
   a first gasket disposed adjacent to the first plate; and
   a second gasket disposed adjacent to the second plate.

4. The mount of claim 2, further comprising a washer disposed between the handle and the second plate.

5. The mount of claim 2, wherein the second plate includes mounting apertures adapted to respectively receive fasteners to couple the second plate to the support structure.

6. The mount of claim 1, wherein the first plate includes apertures and the base includes protrusions adapted to respectively releasably couple with the apertures.

7. The mount of claim 1, wherein the first plate includes mounting apertures adapted to respectively receive fasteners to couple the first plate to the support structure.

8. The mount of claim 1, further comprising a seal disposed on the first plate.

9. The mount of claim 1, wherein the base includes a tubular portion adapted to receive a pole and a bell-shaped portion.

10. The mount of claim 9, wherein the tubular portion includes a rigid bar adapted to restrict rotation of the pole.

11. The mount of claim 9, wherein the tubular portion includes a drain aperture.

12. The mount of claim 9, further comprising a liner disposed in the tubular portion.

13. The mount of claim 1, wherein the handle includes a shank portion.

14. The mount of claim 13, wherein the shank portion is adapted to be threadably coupled to an aperture disposed in the base.

15. The mount of claim 1, wherein the base is adapted to be rotated at fixed angle increments relative to the first plate.

16. The mount of claim 15, wherein the fixed angle increments are 22.5°.

17. A mount comprising:
   a first plate disposed on a first side of a support structure and including apertures, wherein the support structure includes opposing first and second sides;
   a seal coupled to the first plate;
   a second plate disposed on the second side of the support structure;
   a first gasket disposed between the first plate and the first side of the support structure;
   a second gasket disposed between the second plate and the second side of the support structure;
   a handle adapted to rotate in first and second rotational directions and including a grip portion and a threaded shank portion, wherein the grip portion is disposed on the second side of the support structure; and
   a base disposed on the first side of the support structure and including a tubular portion adapted to receive a pole, a bell-shaped portion that includes an aperture adapted to threadably couple with the threaded shank portion, and protrusions adapted to respectively releasably couple with the apertures of the first plate,
   wherein the protrusions respectively couple with the apertures when the handle is rotated in the first rotational direction, and the base is adapted to be rotated relative to the first plate when the handle is rotated in the second rotational direction.

18. The mount of claim 17, further comprising a washer disposed between the second plate and the grip portion of the handle.

* * * * *